(12) United States Patent
Nair et al.

(10) Patent No.: US 10,634,913 B2
(45) Date of Patent: Apr. 28, 2020

(54) SYSTEMS AND METHODS FOR TASK-BASED ADJUSTABLE FOCAL DISTANCE FOR HEADS-UP DISPLAYS

(71) Applicant: SYMBOL TECHNOLOGIES, LLC, Lincolnshire, IL (US)

(72) Inventors: Chandra M. Nair, Mount Sinai, NY (US); Wenjun Sun, South Setauket, NY (US); Curt D. Croley, Stony Brook, NY (US); Steven D. Sieckowski, Port Jefferson, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 15/877,080

(22) Filed: Jan. 22, 2018

(65) Prior Publication Data
US 2019/0227311 A1 Jul. 25, 2019

(51) Int. Cl.
*G06F 9/00* (2006.01)
*G02B 27/01* (2006.01)
*G06Q 10/10* (2012.01)
*G06F 3/01* (2006.01)
*G06K 9/00* (2006.01)

(52) U.S. Cl.
CPC .......... *G02B 27/017* (2013.01); *G06F 3/013* (2013.01); *G06K 9/00577* (2013.01); *G06K 9/00624* (2013.01); *G06K 9/00671* (2013.01); *G06Q 10/1097* (2013.01)

(58) Field of Classification Search
CPC .. G02B 27/017; G06F 3/013; G06K 9/00577; G06K 9/00624; G06Q 10/1097

USPC ................................................ 345/419, 633
See application file for complete search history.

(56) References Cited

U.S. PATENT DOCUMENTS

| | | | |
|---|---|---|---|
| 8,203,502 B1 | 6/2012 | Chi et al. | |
| 8,878,749 B1* | 11/2014 | Wu | G01S 17/06 345/8 |
| 2011/0018903 A1* | 1/2011 | Lapstun | G02B 26/06 345/633 |
| 2011/0075257 A1* | 3/2011 | Hua | G02B 27/017 359/464 |
| 2012/0113092 A1* | 5/2012 | Bar-Zeev | G02B 27/017 345/419 |

(Continued)

OTHER PUBLICATIONS

International Search Report and Written Opinion for International Application No. PCT/US2018/066833 dated Mar. 5, 2019.

*Primary Examiner* — Tony O Davis
(74) *Attorney, Agent, or Firm* — Yuri Astvatsaturov (57) ABSTRACT

Systems and methods are provided for task-based modification of visual media in a heads-up display. An example system includes a heads-up display assembly configured to be worn by a user, the heads-up display assembly including a head mount and a presentation generator configured to display visual media to the user. The example system further includes a memory, and a processor configured to interface with the presentation generator and the memory. The processor identifies a current task associated with the user, and obtains a focal distance at which the visual media is to be displayed to the user during the performance of the current task. The processor causes the presentation to display the visual media at the obtained focal distance during performance of the current task.

18 Claims, 9 Drawing Sheets

(56) References Cited

U.S. PATENT DOCUMENTS

| | | | |
|---|---|---|---|
| 2013/0194259 A1* | 8/2013 | Bennett | G06T 19/006 345/420 |
| 2013/0258486 A1* | 10/2013 | Ionescu | G02B 27/0172 359/630 |
| 2014/0108078 A1 | 4/2014 | Davis | |
| 2014/0145931 A1 | 5/2014 | Kim et al. | |
| 2014/0306866 A1 | 10/2014 | Miller et al. | |
| 2015/0226969 A1* | 8/2015 | Tsukahara | H04N 5/2329 359/462 |
| 2015/0262424 A1* | 9/2015 | Tabaka | G02B 27/0075 345/633 |
| 2016/0131908 A1* | 5/2016 | Fateh | G06F 3/147 345/633 |
| 2016/0277725 A1* | 9/2016 | Ellsworth | G02B 27/017 |
| 2016/0282619 A1* | 9/2016 | Oto | G02B 27/017 |
| 2016/0349510 A1* | 12/2016 | Miller | G02B 27/0172 |
| 2016/0349837 A1* | 12/2016 | Miller | G06F 3/012 |
| 2017/0123210 A1* | 5/2017 | Blanco | G02B 27/0172 |
| 2017/0132460 A1 | 5/2017 | Curlander et al. | |
| 2017/0171538 A1* | 6/2017 | Bell | G06T 19/006 |
| 2017/0309049 A1* | 10/2017 | Law | H04N 13/275 |
| 2018/0052309 A1* | 2/2018 | Lee | G02B 3/0006 |
| 2018/0096503 A1* | 4/2018 | Kaehler | G06T 19/006 |
| 2018/0217377 A1* | 8/2018 | Lam | G02B 27/0172 |
| 2018/0239145 A1* | 8/2018 | Lanman | G02B 27/0172 |
| 2018/0275406 A1* | 9/2018 | Kwon | G02B 27/0961 |
| 2018/0284464 A1* | 10/2018 | Lu | G02B 27/14 |
| 2019/0072747 A1* | 3/2019 | Shi | G02B 13/0045 |
| 2019/0086671 A1* | 3/2019 | Kim | G02B 27/0172 |

* cited by examiner

SYSTEMS AND METHODS FOR TASK-BASED ADJUSTABLE FOCAL DISTANCE FOR HEADS-UP DISPLAYS

BACKGROUND

In an inventory environment, such as a retail store, a warehouse, a shipping facility, etc., many different types of tasks must be performed. These tasks may include, e.g., unloading boxes, sorting inventory, selecting inventory to be packed or placed on a shelf, packing boxes, sorting boxes, loading boxes into vehicles, driving machinery such as forklifts, etc. In many instances, an individual working in the inventory environment must shift his or her focus to different areas within his or her field of view for each new task.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present teachings.

The apparatus and method components have been represented where appropriate by conventional symbols in the drawings, showing only those specific details that are pertinent to understanding teachings of this disclosure so as not to obscure the disclosure with details that will be readily apparent to those of ordinary skill in the art having the benefit of the description herein.

DETAILED DESCRIPTION

Existing heads-up display (HUD) assembly units utilized in inventory environments display visual media uniformly between tasks, without accounting for shifts in focus required for each task. As such, users of existing HUD units often are presented with visual media that is not tailored to the task at hand. Consequently, user of such HUD units must shift focus during the task to while viewing the display, which can cause eye strain and/or increase the time required to complete the task.

Systems and methods are provided for task-based modification of visual media in a heads-up display. An example system disclosed herein includes a heads-up display assembly configured to be worn by a user, the heads-up display assembly including a head mount and a presentation generator configured to display visual media to the user. The example system further includes a memory configured to store computer executable instructions and a processor configured to interface with the presentation generator and the memory, and configured to execute the computer executable instructions. In the example system, the processor identifies a current task associated with the user, and obtains a focal distance at which the visual media is to be displayed to the user during performance of the current task. The processor of the example system causes the presentation generator to display the visual media during performance of the current task at the obtained focal distance.

Figure 1:
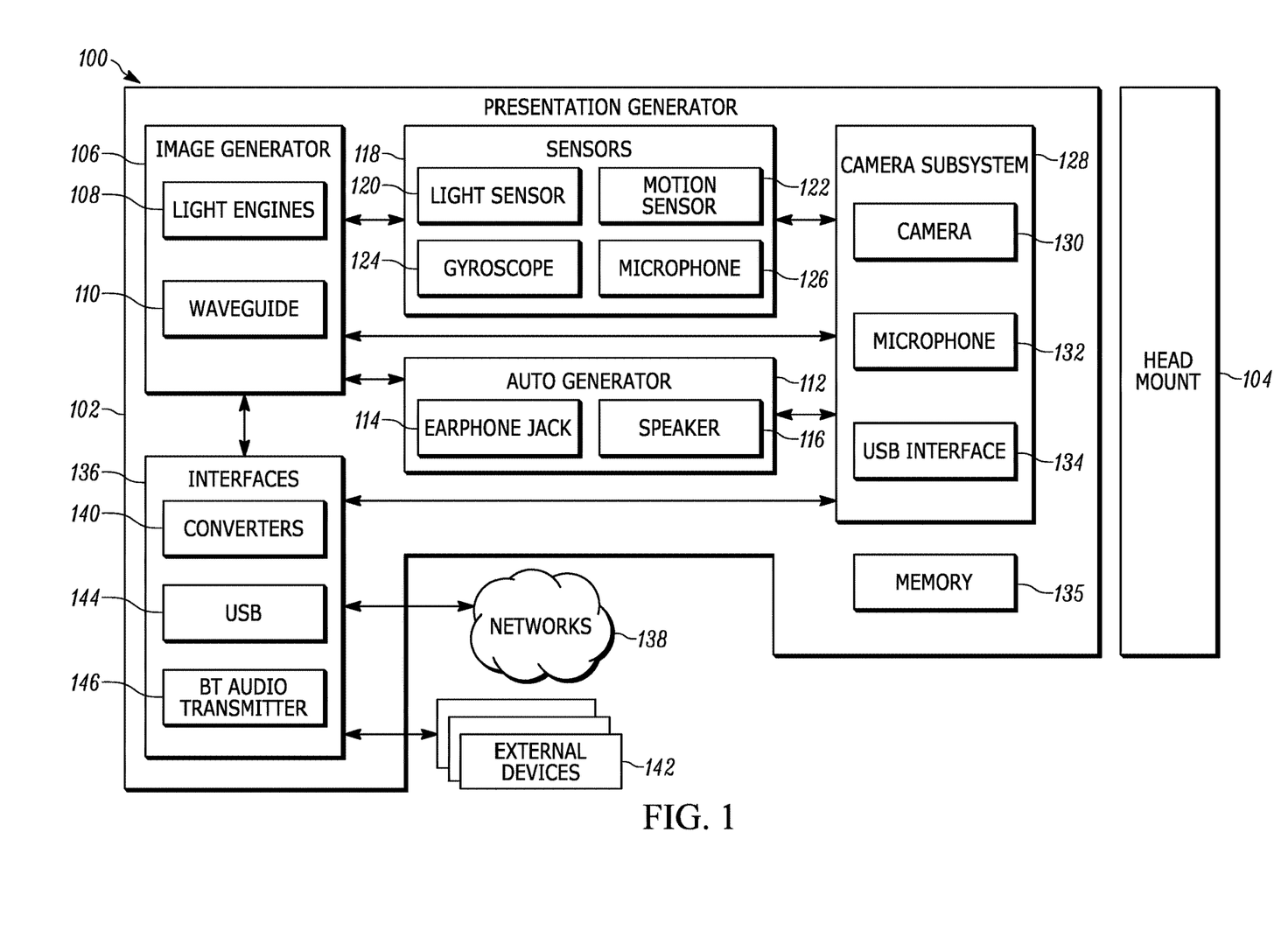
FIG. 1 is a block diagram of an example heads-up display (HUD) assembly constructed in accordance with teachings of this disclosure.

FIG. 1 is a block diagram of an example HUD assembly 100 constructed in accordance with teachings of this disclosure. Alternative implementations of the example HUD assembly 100 of FIG. 1 include one or more additional or alternative elements, processes and/or devices. In some examples, one or more of the elements, processes and/or devices of the example HUD assembly 100 of FIG. 1 may be combined, divided, re-arranged or omitted.

The example HUD assembly 100 of FIG. 1 includes a presentation generator 102 and a head mount 104. The head mount 104 is constructed to mount the presentation generator 102 to a head of a person such that a presentation generated by the presentation generator 102 is consumable by the person. The presentation includes visual media components (e.g., images) and/or audio media components. To generate images such as static or animated text and/or graphics, the example presentation generator 102 of FIG. 1 includes an image generator 106. The example image generator 106 of FIG. 1 is in communication with one or more sources of image data. The image data received at the image generator 106 is representative of, for example, text, graphics and/or augmented reality elements (e.g., information overlaid on objects within the field of view). The example image generator 106 of FIG. 1 includes light engines 108 that convert the received image data into patterns and pulses of light. The light engines 108 communicate the generated light to a waveguide 110, such that the images corresponding to the received data are displayed to the user via the waveguide 110. In some examples, the light engines 110 include optics that condition or manipulate (e.g., polarize and/or collimate) the generated light prior to providing the light to the waveguide 110. While the example image generator 106 utilizes the light engines 108 and the waveguide to present visual components of the presentation, the example HUD assembly 100 of FIG. 1 can employ any suitable image generating technology such as, for example, cathode ray tube (CRT) devices or scanning lasers.

In the example of FIG. 1, the light engines 108 utilize a light source (e.g., light emitting diodes (LEDs)) to generate light based on the received data. In some examples, the light engines 108 receive processed data in condition for immediate conversion into light. In some examples, the light engines 108 process raw image data before converting the image data into light. To perform such processing, the example light engines 108 of FIG. 1 include and/or are in communication with one or more logic circuits configured to process the image data.

The example waveguide 110 of FIG. 1 carries the light received from the light engines 108 in a direction and pattern corresponding to the image data. In examples disclosed herein, the example waveguide 110 of FIG. 1 carries the light received from the light engines in a direction and pattern corresponding to a particular focal distance based on the current task being performed by the user.

In the illustrated example, the waveguide 110 includes a plurality of internal surfaces that form a light guide to internally reflect the light as the light travels from an input to an output. The example waveguide 110 includes gratings at the output to diffract the light towards an eye of the user, thereby displaying the image to the user. In the illustrated example, the waveguide 110 is transparent such that the user can view surroundings simultaneously with the displayed image, or the surroundings only when no image is displayed on the waveguide 110.

The example waveguide 110 of FIG. 1 includes first and second lenses arranged to be placed over first and second eyes, respectively, of the user. However, any suitable shape or size is possible for the waveguide 110. To achieve a desired or selected focal distance for the displayed visual media, in some instances the first and second lenses are configured such that their position is mechanically adjusted based on the focal distance for the current task. Additionally, in some examples, the first and second lenses are oscillating lenses configured to shift based to present the visual media in accordance with the desired or selected focal distance for the current task. Additionally or alternatively, liquid lenses that change curvature based on supplied voltage may be placed over the first and second lenses, with the voltage supplied to the liquid lenses based on the desired or selected focal distance for the current task.

The example presentation generator 102 of FIG. 1 includes an audio generator 112 that receives audio data and converts the audio data into sound via an earphone jack 114 and/or a speaker 116. In some examples, the audio generator 112 and the image generator 106 cooperate to generate an audiovisual presentation.

In the example of FIG. 1, the example presentation generator 102 includes (e.g., houses and/or carries) a plurality of sensors 118. In the example of FIG. 1, the plurality of sensors 118 include a light sensor 122, a motion sensor 124 (e.g., an accelerometer), a gyroscope 126 and a microphone 128. In some instances, the plurality of sensors 118 may include a sensor configured to detect signals transmitted by a Bluetooth low energy radio. In some examples, the presentation generated by the example image generator 106 and/or the audio generator 112 is affected by one or more measurements and/or detections generated by one or more of the sensors 118. For example, a characteristic (e.g., degree of opacity) of the display generated by the image generator 106 may depend on an intensity of ambient light detected by the light sensor 120. Additionally or alternatively, one or more modes, operating parameters, or settings are determined by measurements and/or detections generated by one or more of the sensors 118. For example, the presentation generator 102 may enter a standby mode if the motion sensor 122 has not detected motion in a threshold amount of time.

The example presentation generator 102 of FIG. 1 includes a camera sub-system 128. In some examples, the camera sub-system 128 is mounted to or carried by the same housing as the presentation generator 102. In some examples, the camera sub-system 128 is mounted to or carried by the head mount 104. The example camera sub-system 128 includes one or more cameras 130 and a microphone 132 to capture image data and audio data, respectively, representative of an environment surrounding the HUD assembly 100. In some examples, camera sub-system 128 includes one or more cameras 130 to capture image data representative of a user of the HUD assembly 100. For example, the image data representative of the user of the HUD assembly 100 includes image data representative of the eyes of the user or the face of the user.

In some examples, image and/or audio data captured by the cameras 130 and/or microphone 132 is integrated with the presentation generated by the image generator 106 and/or the audio generator 112. For example, the camera sub-system 128 of FIG. 1 communicates data to the image generator 102, which may process the image data and to generate one or more corresponding images on the waveguide 110. In some examples, the image data and/or audio data captured by the cameras 130 and/or the microphone 132, respectively, is stored in memory 135 of the example HUD assembly 100. In some examples, the image data and/or audio data captured by the cameras 130 and/or the microphone 132, respectively, is communicated via, for example, a USB interface 134 of the camera sub-system 128 to a device (e.g., a server or external memory) external to the HUD assembly 100.

The example presentation generator 102 of FIG. 1 includes a plurality of interfaces 136 configured to enable the HUD assembly 100 to communicate with one or more external devices 136 and one or more networks 138. In the example of FIG. 1, the interfaces 136 include converters 140 (e.g., an HDMI to LVDS-RGB converter) to convert data from one format to another, a USB interface 142, and a Bluetooth® audio transmitter 146. In some examples, the example Bluetooth® audio transmitter 146 cooperates with one or both of the microphones 126, 132 of the HUD assembly 100 to receive voice input from the user and to convey the voice input to one or more of the external devices 136. For example, voice input may be provided to a mobile computing device being worn by the user via the HUD assembly 100 using the Bluetooth® audio transmitter 146. Examples external devices 136 include keypads, Bluetooth® click buttons, smart watches, and mobile computing devices.

The example image generator 106, the example light engines 108, the example audio generator 112, the example camera-sub-system 128, the example converters 140, the example USB interfaces 134, 144 and/or, more generally, the example presentation generator 102 of FIG. 1 are implemented by hardware, software, firmware, and/or any combination of hardware, software and/or firmware. In some examples, at least one of the example image generator 106, the example light engines 108, the example audio generator 112, the example camera-sub-system 128, the example converters 140, the example USB interfaces 134, 144 and/or, more generally, the example presentation generator 102 of FIG. 1 is implemented by a logic circuit.

As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations. Some example logic circuits are hardware that executes machine-readable instructions to perform operations. Some example logic circuits include a combination of specifically configured hardware and hardware that executes machine-readable instructions.

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) can be stored. Further, as used herein, each of the terms "tangible machine-readable medium," "non-transitory machine-readable medium" and "machine-readable storage device" is expressly defined to exclude propagating signals. That is, as used in any claim of this patent, a "tangible machine-readable medium" cannot be read to be implemented by a propagating signal. Further, as used in any claim of this patent, a "non-transitory machine-readable medium" cannot be read to be implemented by a propagating signal. Further, as used in any claim of this patent, a "machine-readable storage device" cannot be read to be implemented by a propagating signal.

Additionally, as used herein, each of the terms "tangible machine-readable medium," "non-transitory machine-readable medium" and "machine-readable storage device" is expressly defined as a storage medium on which machine-readable instructions are stored for any suitable duration of time (e.g., permanently, for an extended period of time (e.g., while a program associated with the machine-readable instructions is executing), and/or a short period of time (e.g., while the machine-readable instructions are cached and/or during a buffering process)).

Figure 2A:
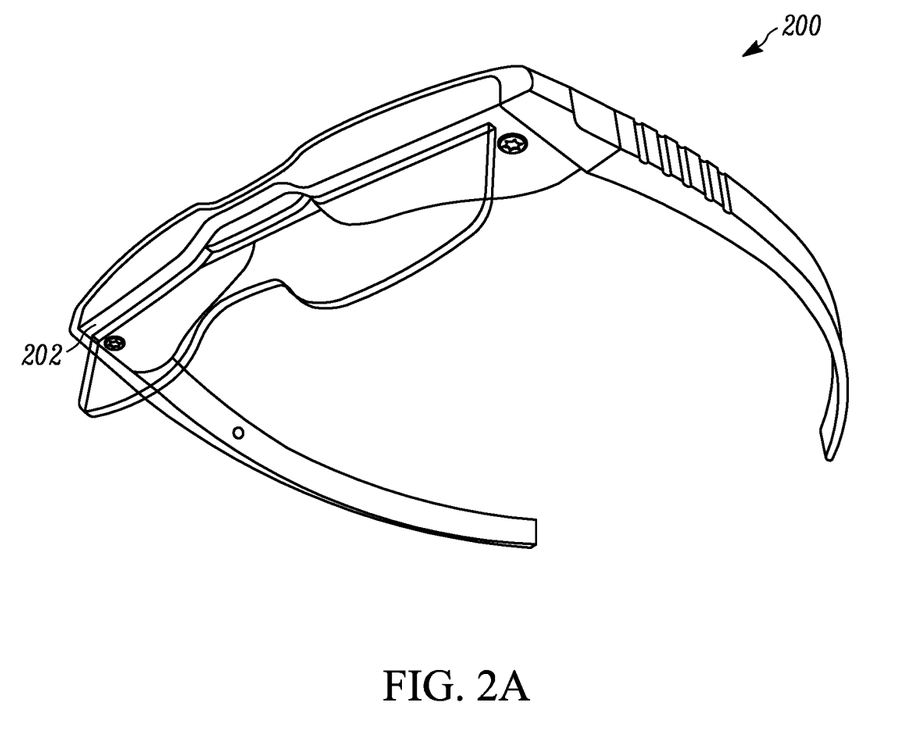
FIGS. 2A and 2B illustrate an example HUD assembly that may implement the example HUD assembly of FIG. 1 in accordance with some embodiments.
Figure 2B:
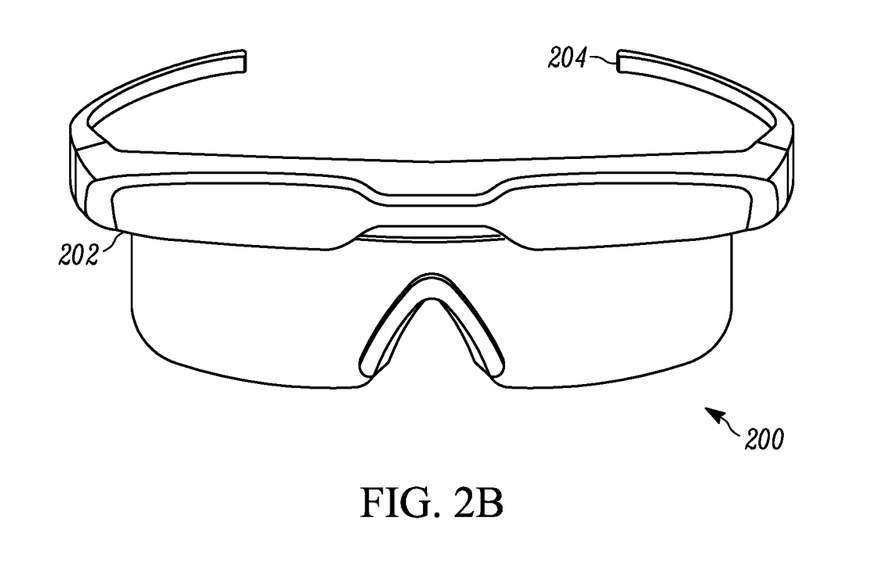

FIGS. 2A and 2B illustrate an example HUD assembly 200 that may implement the example HUD assembly 100 of FIG. 1. The example HUD assembly 200 of FIG. 2A includes a presentation generator 202 and an example head mount 204. The example presentation generator 202 of FIG. 2A houses or carries components configured to generate, for example, an audiovisual presentation for consumption by a user wearing the example HUD assembly 200 of FIG. 2A. For example, the presentation generator 202 of FIG. 2A houses or carries the components of the example presentation generator 102 of FIG. 1.

Figure 3:
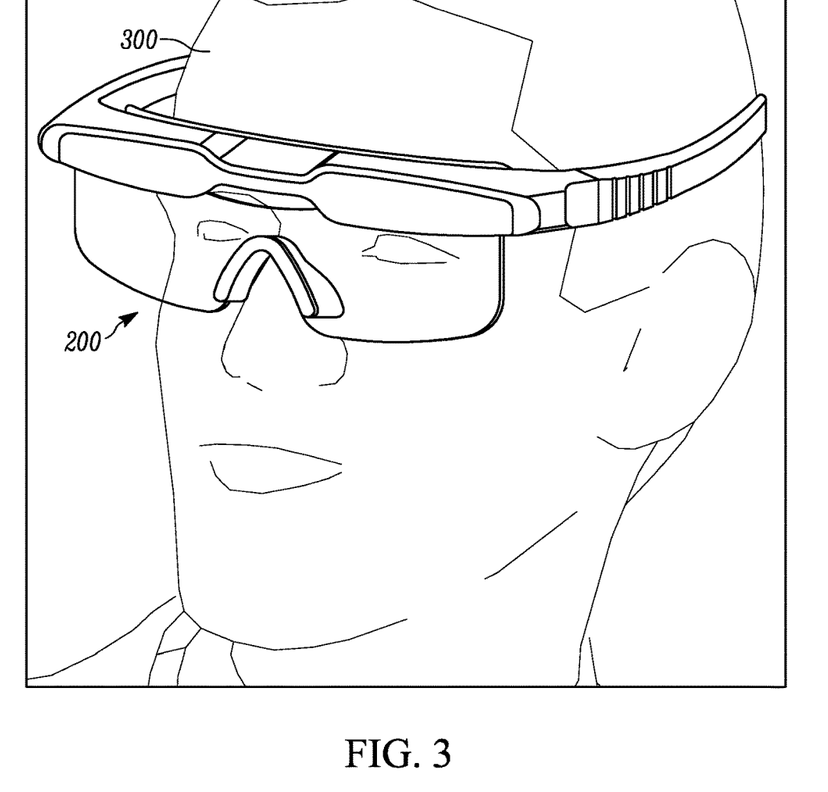
FIG. 3 illustrates the example HUD assembly of FIGS. 2A and 2B mounted to a head of a user.

FIG. 3 illustrates the example HUD assembly 200 of FIGS. 2A and 2B mounted to a head 300 of a user.

Figure 4:
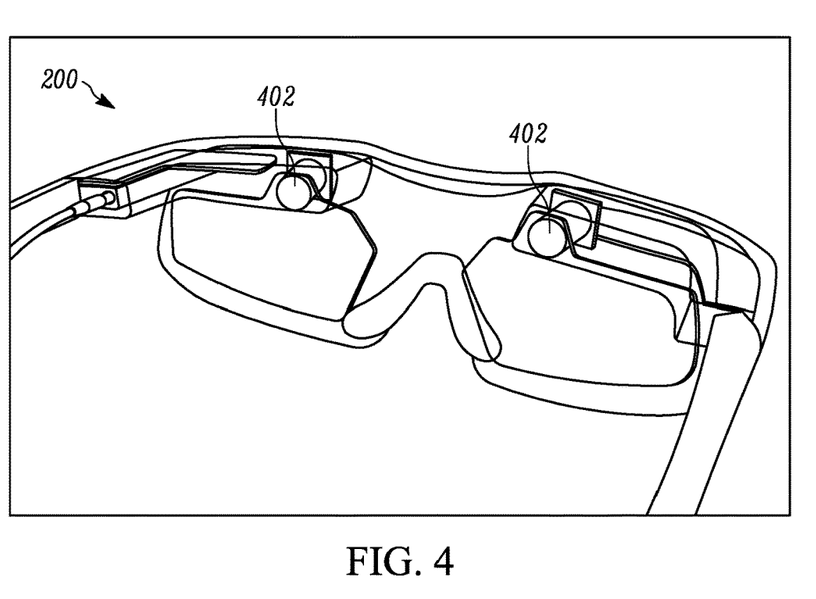
FIG. 4 illustrates example light engines mounted to an example HUD assembly in accordance with some embodiments.

FIG. 4 illustrates example light engines 402 that implement, for example, the light engines 108 of FIG. 1 to display visual media to the user of the HUD assembly. As described above, the light engines 402 generate light to be carried by the waveguide. While the example light engines 402 of FIG. 4 are positioned above each eyepiece, the light engines 402 may be positioned in any suitable location such as, for example, at the edge of the frames.

Figure 5A:
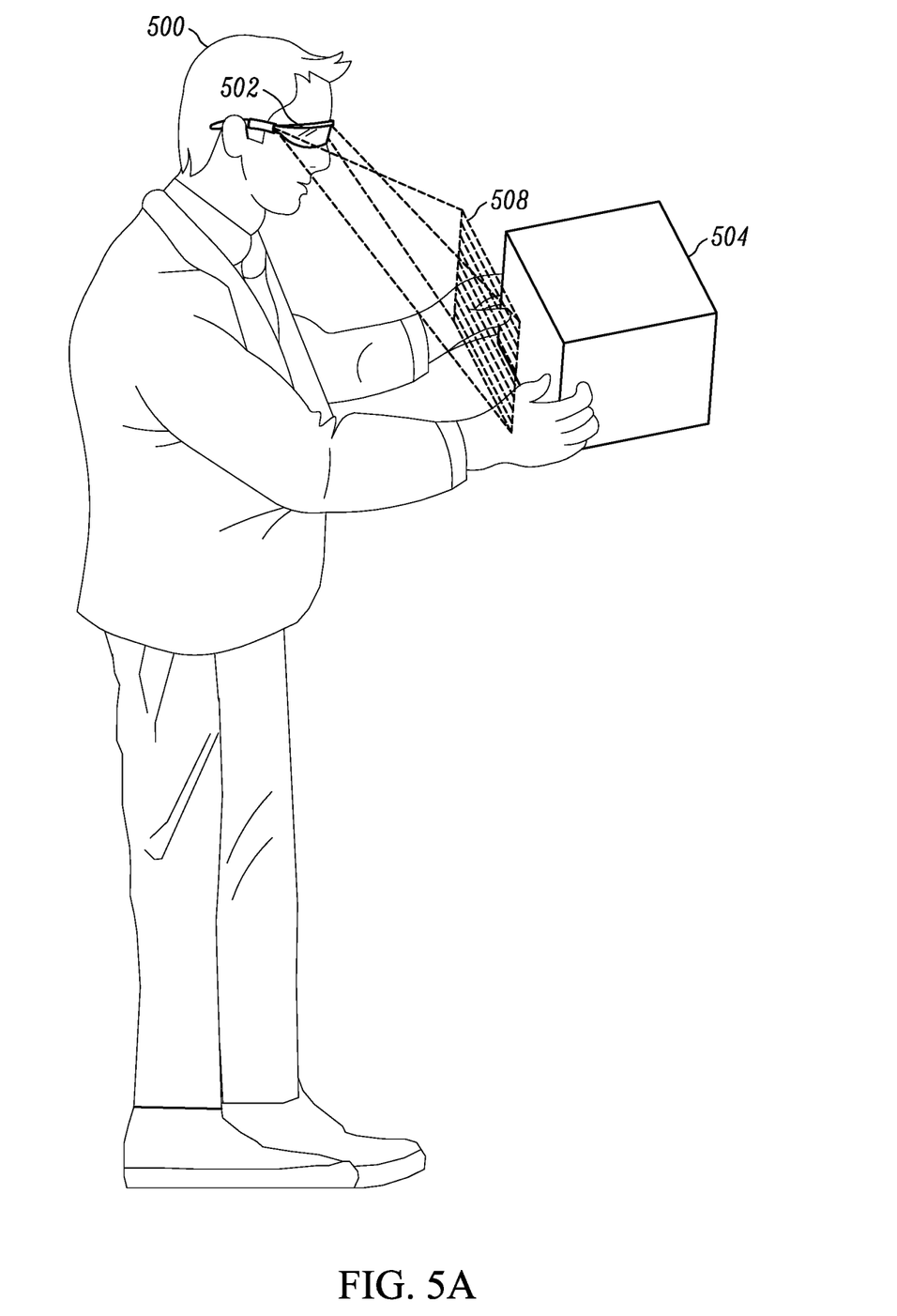
FIGS. 5A and 5B illustrate examples of how the visual media displayed by the example presentation generator of FIG. 1 is modified based on the current task in accordance with teachings of this disclosure.
Figure 5B:
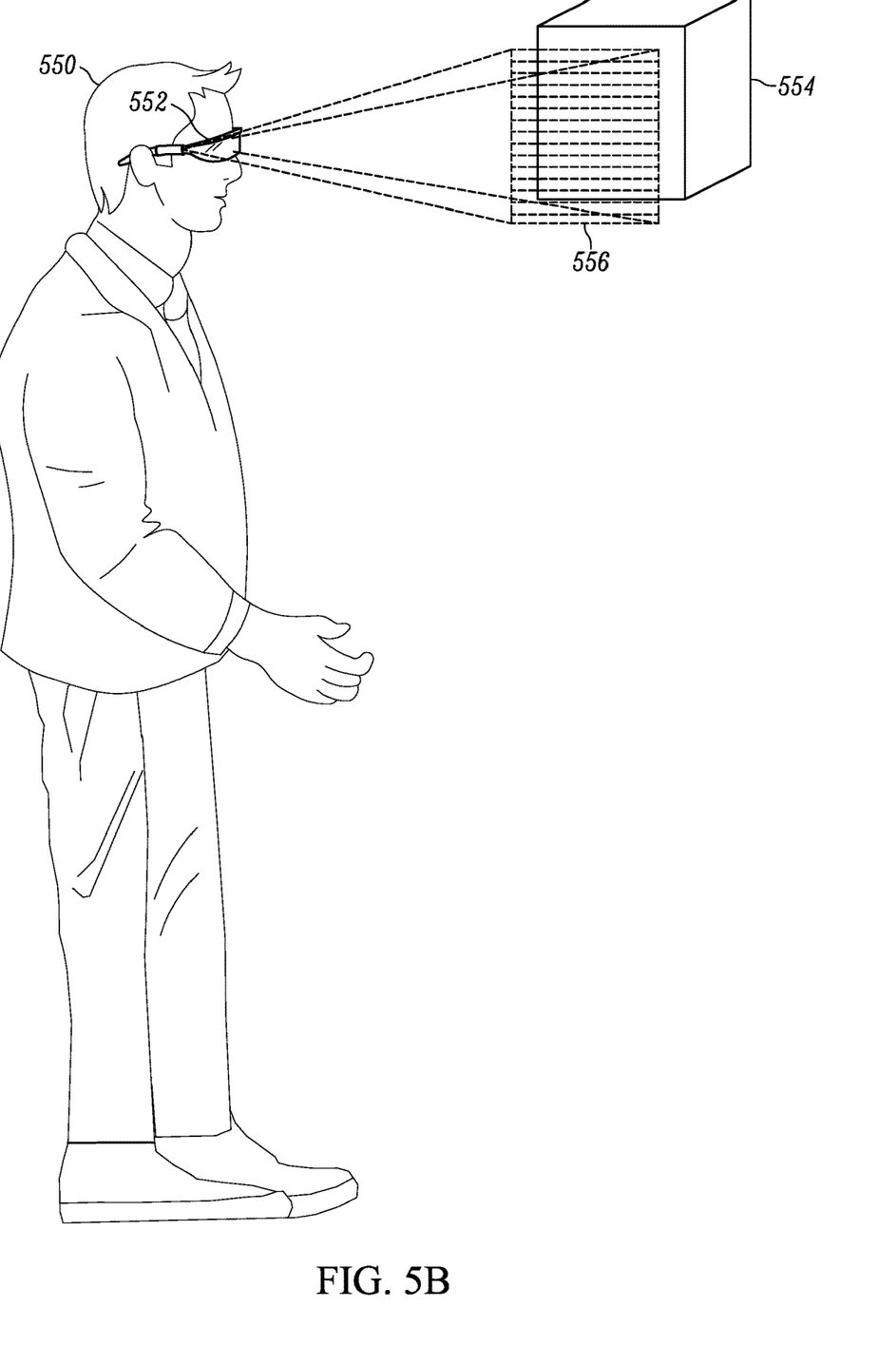

FIGS. 5A and 5B illustrate an example of how the visual media displayed by the presentation generator of the HUD assembly is controlled and/or modified based on a current task being performed by a user and/or a scheduled task for the user, in accordance with teachings of this disclosure. Generally speaking, the presentation generator of the example HUD assemblies disclosed herein controls the display of the visual media based on the user's current task to, for example, reduce or avoid eye strain or eye fatigue. Eye strain and eye fatigue can occur when a user needs to shift his or her focus between near and far objects. Accordingly, in examples disclosed herein, the visual media is displayed to appear farther away during tasks related to farther away objects, and is displayed to appear closer to the user during tasks related to objects that are close to the user, so that the user does not need to shift focus between the task-related object and the visual media while performing the task.

For example, as shown in FIG. 5A, a user 500, wearing a HUD assembly 502, performing a task related to a box object 504 (such as, e.g., reading or scanning a label attached to the box object 504), examines the box object 504 at close proximity (e.g., one or two feet away) to perform the task. In this example, based on the requirements of the current task, the visual media 508 is displayed so that it appears to be a short distance away from the user 500. That is, when the visual media 508 is displayed at a shorter focal distance, the user 500 can reduce eye strain by maintaining a similar focal distance both when focusing on the visual media 508 and when focusing on the box object 504. Accordingly, the presentation generator of the HUD assembly 502 displays the visual media 508 so that it appears at a focal distance similar to the focal distance of the box object 504 related to the user's current task.

On the other hand, the focal distance at which the visual media 508 is displayed as shown in FIG. 5A is not suitable for a different task requiring the user to focus on objects farther away from the user 500. That is, if the user 500 needs to focus on farther away objects while performing the task, but the visual media appears to be close to the user 500, the user's eyes will need to alternate between focusing on the visual media that appears to be close by and focusing on a physical object that is far away. Accordingly, examples disclosed herein modify or control the location of the visual media as it appears to the user 500 when the current task changes.

For example, a user 550 of FIG. 5B, wearing a HUD assembly 552, is performing a different task than the user 500 of FIG. 5A. In the example of FIG. 5B, the user 550 is viewing a box object 554 from a distance (e.g., ten to fifteen feet away) to perform the current task. For instance, the user 550 of FIG. 5B is tasked with identifying one box object 554 from many other box objects (not shown) on a shelf located across a room. In the example of FIG. 5B, based on the requirements of the user's current task, examples disclosed herein display the visual media 558 so that it appears to be farther away from the user 550, i.e., at a greater focal distance from the user 550. That is, when the visual media 558 is displayed at a greater focal distance, the user 550 of FIG. 5B can reduce eye strain by maintaining a similar focal distance both when focusing on the visual media 558 and when focusing on objects related to the performance of the task (i.e., identifying the box object 554 among other objects on a shelf located across the room from the user 550). Accordingly, in this example, the presentation generator of the HUD assembly 552 displays the visual media 558 at a focal distance similar to the focal distance of the box object 554 related to the user's current task.

Figure 6:
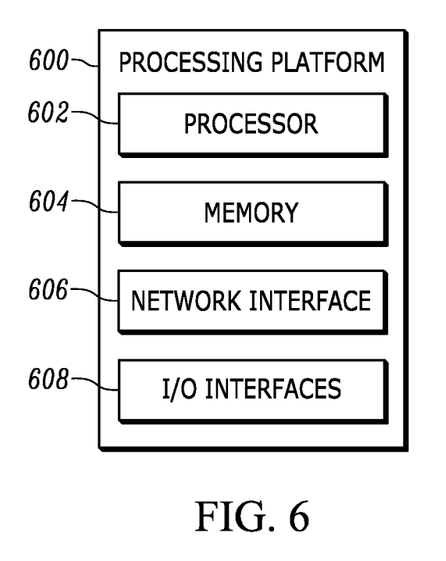
FIG. 6 is a block diagram representative of an example logic circuit configured to implement example methods and apparatus disclosed herein.

FIG. 6 is a block diagram representative of an example logic circuit that may be utilized to implement, for example, the example image generator 106, the example light engines 108, one or more of the example interfaces 136, the example audio generator 112 of FIG. 1, and/or, more generally, the example presentation generator 100 of FIG. 1. The example logic circuit of FIG. 6 is a processing platform 600 capable of executing machine-readable instructions to, for example, implement operations associated with, for example, the example HUD assembly 100 of FIG. 1.

The example processing platform 600 of FIG. 6 includes a processor 602 such as, for example, one or more microprocessors, controllers, and/or any suitable type of processor. The example processing platform 600 of FIG. 6 includes memory (e.g., volatile memory, non-volatile memory) accessible by the processor 602 (e.g., via a memory controller). The example processor 602 interacts with the memory 604 to obtain, for example, machine-readable instructions stored in the memory 604. Additionally or alternatively, machine-readable instructions may be stored on one or more removable media (e.g., a compact disc, a digital versatile disc, removable flash memory, etc.) that may be coupled to the processing platform 600 to provide access to the machine-readable instructions stored thereon. In particular, the machine-readable instructions stored on the memory 604 may include instructions for carrying out any of the methods described in greater detail below at FIGS. 7-12.

The example processing platform 600 of FIG. 6 further includes a network interface 606 to enable communication with other machines via, for example, one or more networks. The example network interface 606 includes any suitable type of communication interface(s) (e.g., wired and/or wireless interfaces) configured to operate in accordance with any suitable protocol(s). The example processing platform 600 of FIG. 6 includes input/output (I/O) interfaces 608 to enable receipt of user input and communication of output data to the user.

Figure 7:
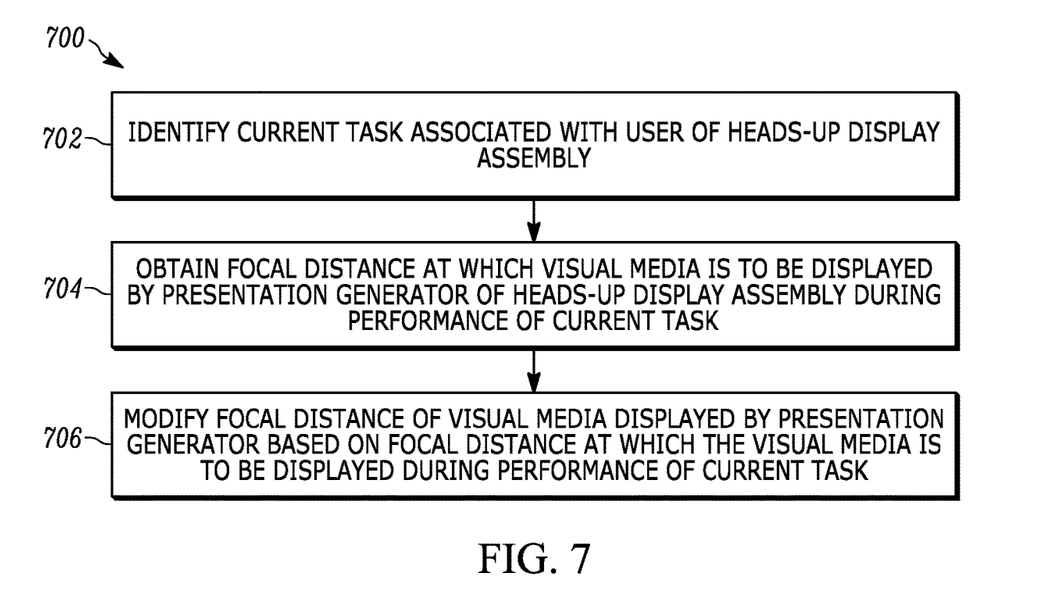
FIG. 7 is a flowchart representative of machine-readable instructions that may be executed to implement an example method of task-based modification of visual media in a HUD assembly configured to be worn by a user, in accordance with teachings of this disclosure.

FIG. 7 is a flowchart of an example method 700 for task-based control and/or modification of visual media in a HUD assembly configured to be worn by a user, in accordance with teachings of this disclosure. The example method 700 can be implemented as, for example, a set of instructions stored on the computer-readable memory 604 and executable on one or more processors 602.

At block 702, a current task associated with a user of a HUD assembly is identified. For example, the user of the HUD assembly may work in an inventory environment such as a retail store, a warehouse, a shipping facility, etc. Various tasks to be performed by a user in the inventory environment can include unloading boxes, sorting inventory, selecting inventory to be packed or placed on a shelf, packing boxes, sorting boxes, loading boxes into vehicles, driving machinery such as forklifts, etc. Users often switch between tasks, e.g., over the course of the hour, day, week, etc. For example, a user performs the task of unloading boxes in the morning and performs the task of sorting inventory in the afternoon. As another example, a user packs boxes until they are full and then loads the full boxes into a vehicle periodically.

In some examples, identifying the current task associated with the user includes identifying a specific task being performed by the user at the current time. Additional or alternatively, identifying the current task includes identifying a type or category of task being performed by the user at the current time. For instance, the tasks can be categorized by the focal distance recommended or desired (e.g., according to testing and/or personal preference) for each task (e.g., short focal distance tasks, medium focal distance tasks, long focal distance tasks, etc.), or in categories such as packing tasks, sorting tasks, loading tasks, lifting tasks, etc.

Exemplary methods for identifying the current task being performed by the user of the HUD assembly are discussed in greater detail with respect to FIGS. 9-12.

At block 704, a focal distance at which the visual media is to be displayed during the performance of the current task is obtained. As described above, the visual media is displayed by a presentation generator of a HUD assembly worn by the user. The visual media includes, e.g., instructions or information related to the current task being performed. Moreover, in various instances the visual media may include both two-dimensional and three-dimensional text, images, and/or videos related to the current task being performed. In some instances, the visual media appears as "augmented reality" overlaid over an environment including the user.

Each task to be performed by a user will have a suitable and/or preferred focal distance (or a range of suitable focal distances) at which the visual media is displayed by the HUD assembly to, for example, avoid eye strain and fatigue. Different tasks performed by the user will typically each have different suitable focal distances (or ranges of suitable focal distances). To avoid eye strain and fatigue, examples disclosed herein recognize that the visual media should be displayed so that it appears to be on a similar focal plane at which the user is already focusing, so that the user does not need to shift focus between the visual media and the task-related focus. That is, if the user is tasked with focusing on something farther away during a particular task, the visual media should be displayed so that the visual media also appears to be farther away from the user while that task is being performed. Similarly, if the user is tasked with focusing on something closer to the user during a different task, the visual media should be displayed so that the visual media appears to be closer to the user while that task is being performed. An exemplary method for obtaining the focal distance at which the visual media is to be displayed is discussed in greater detail with respect to FIG. 8.

At block 708, the focal distance of the visual media displayed by the presentation generator is controlled or modified based on the obtained focal distance associated with the performance of the current task. That is, the presentation generator displays the visual media so that the visual media appears to be located at the same or similar focal distance as an existing task-related focus. Advantageously, in this way, eye strain or eye fatigue that occurs when users frequently shift their visual focus between focal distances may be reduced.

In some instances, the focal distance of the visual media displayed by the presentation generator is additionally controlled and/or modified based on specific user characteristics. For example, the focal distance may be additionally controlled and/or modified based on the distance between the user's pupils (interpupillary distance). Generally speaking, interpupillary distance varies between individuals, typically ranging from around 55 mm to around 75 mm. The interpupillary distance for a particular user may be calculated by detecting the positions of each of the user's pupils by a camera oriented towards the user's face. Based on the user's interpupillary distance, a preferred or suitable focal distance of the visual media may be longer or shorter. Moreover, in some instances, the horizontal or vertical position of the visual media displayed by the presentation generator is additionally controlled and/or modified based on the current task to obtain additional or alternative advantages. For example, during a task that involves stacking objects on shelves, the position of the visual media may be modified vertically to match the user's eyes that are looking upward. As another example, during a task that involves scanning a room or a shelf to search for an object, the position of the visual media may be dynamically modified horizontally, matching the user's eyes as the user scans a room or shelf horizontally. Accordingly, the task will require fewer positional shifts in the user's focus, because the visual media will appear to be located in a position related to the current task. Advantageously, eye strain or eye fatigue that occurs when users must frequently shift their visual focus horizontally and/or vertically may be reduced.

In some instances, the vertical position of the visual media displayed by the presentation generator is additionally controlled and/or modified based on whether the user is currently wearing bifocal or progressive lenses. That is, these types of corrective lenses require a wearer of the lenses to look downward to view objects that are closer to the wearer and to look upward to view objects that are further away from the wearer. Accordingly, for a user wearing bifocal or progressive lenses, based on the focal distance at which the visual media is to be displayed during the performance of the current task, the visual media may be adjusted vertically upward if the focal distance is longer and vertically downward if the focal distance is shorter.

Figure 8:
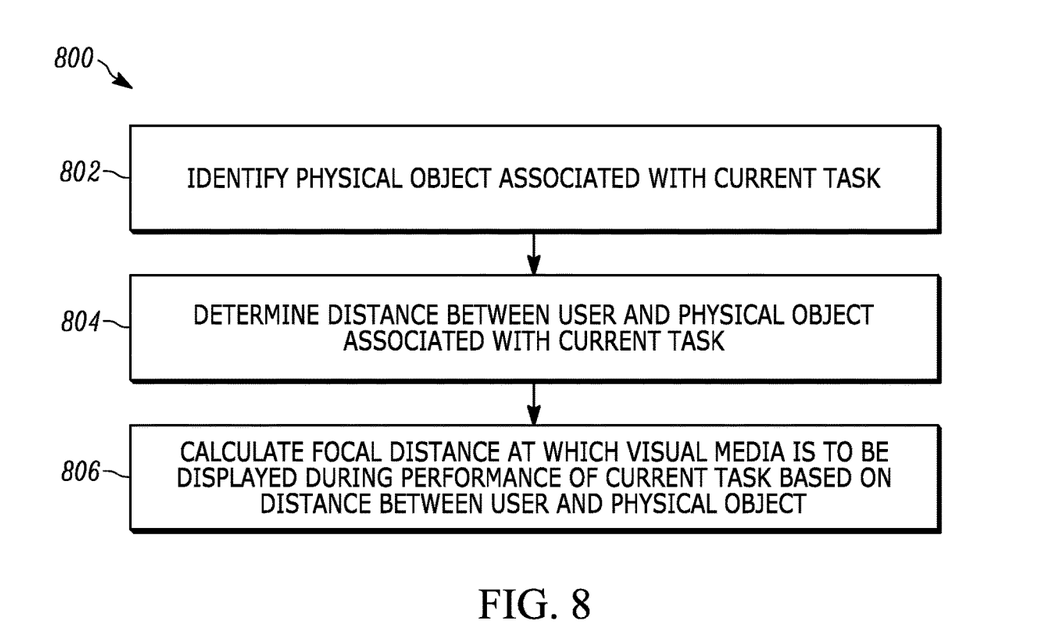
FIG. 8 is a flowchart representative of machine-readable instructions that may be executed to implement an example method of obtaining a focal distance at which visual media is to be displayed by a presentation generator of a HUD assembly during the performance of a particular task, in accordance with teachings of this disclosure.

FIG. 8 is a flowchart of an example method 800 of obtaining a focal distance at which visual media is to be displayed by a presentation generator of a HUD assembly during the performance of a particular task, in accordance with some embodiments, expanding upon block 704 of FIG. 7. The method 800 can be implemented as a set of instructions stored on the computer-readable memory 604 and executable on one or more processors 602.

At block 802, a physical object associated with the current task is identified. The physical object may be a box, package, or other inventory item, or may be a label attached to a box or other package. For instance, if the current task is to unload a particular box from a vehicle, the physical object associated with the current task would be the particular box to be unloaded. As another example, if the current task is to sort inventory, the physical objects associated with the current task are the inventory objects to be sorted.

In some instances, the physical object associated with the current task is identified via a camera or other sensor mounted to the HUD assembly that detects data indicative of the physical object (e.g., in a user's environment). For example, an external marker or tag may be affixed to the physical object, identifying the object. In some instances, the physical object associated with the current task is identified by accessing (e.g., by a processor) a database that stores data identifying physical objects associated with particular tasks, and by matching the current task to an associated physical object in the database. In some instances, the physical object associated with the current task is identified based on user input. For example, the HUD assembly communicates with a handheld user device, through which a user selects a physical object related to the current task (e.g., via a keyboard, or by scanning a physical object).

At block 804, a distance between the user and a physical object associated with the current task is determined. In some instances, the distance between the user and the physical object associated with the current task is an actual distance, which may be determined via, e.g., a sensor mounted to the HUD assembly. For example, the sensor can be used to determine the distance between a user and a box in front of the user, or a box currently held by the user. As one example, a sensor mounted to the HUD assembly measures a time it takes a light signal emitted by light source mounted to the HUD assembly to reach the physical object and return to the sensor. In this way, the distance between the HUD assembly and the physical object (and, accordingly, the distance between the user and the physical object) may be determined based on the measured time.

In some embodiments, the distance between the user and the physical object associated with the current task is an expected or estimated distance based on the current task or based on the physical object. For example, in some instances, a processor accesses a database containing expected or estimated distances between the user and a physical object for a variety of tasks, and matches the current task to an expected or estimated distance listed in the database. For instance, some tasks generally require a user to be a greater or lesser distance from a physical object. For example, when a user performs a task that involves reading or scanning a label, the user may generally need to be close to the object upon which the label has been placed. Accordingly, when a user is performing the task of reading or scanning the label, the estimated or expected distance between the user and the physical object may be a generally short distance (e.g., two feet). On the other hand, when a user is locating a particular box in a warehouse, the estimated or expected distance between the user and the physical object may be greater (e.g., ten feet).

Additionally or alternatively, in instances in which an external marker or tag identifying the object is affixed to the object, the external marker or tag includes an indication of an expected or estimated distance between the user and the physical object for tasks related to that object.

At block 806, a focal distance at which the visual media is to be displayed during the performance of the current task is calculated. Generally, the focal distance at which to display the visual media during a particular task is related to the distance between the user and the physical object associated with that task. That is, to avoid or reduce eye strain and/or eye fatigue, the visual media should appear to be located at a focal distance that is greater when the physical object is farther away from the user, but shorter when the physical object is closer to the user. In some instances, the focal distance at which to display the visual media during a particular task will be equal to the distance between the user and the object associated with that task. In some instances, the focal distance at which to display the visual media during a particular task will be a range of distances (e.g., within one foot of the object associated with the task, within five feet of the object associated with the task, etc.).

Additionally or alternatively, in some examples, the suitable and/or preferred focal distance at which the visual media is to be displayed during the performance of each task is determined by analyzing data associated with other users performing the same task. For instance, if data associated with other users who perform a particular task indicates that users report less frequent or less intense eye fatigue when the visual media appears at a focal distance within six inches of the object associated with the task, the suitable and/or preferred focal distance for performing that task may within six inches of the object associated with the task.

Accordingly, a suitable focal distance at which visual media is to be displayed during the performance of a particular task may be calculated by identifying a physical object related to the task and an actual or expected distance between the physical object and the user.

Figure 9:
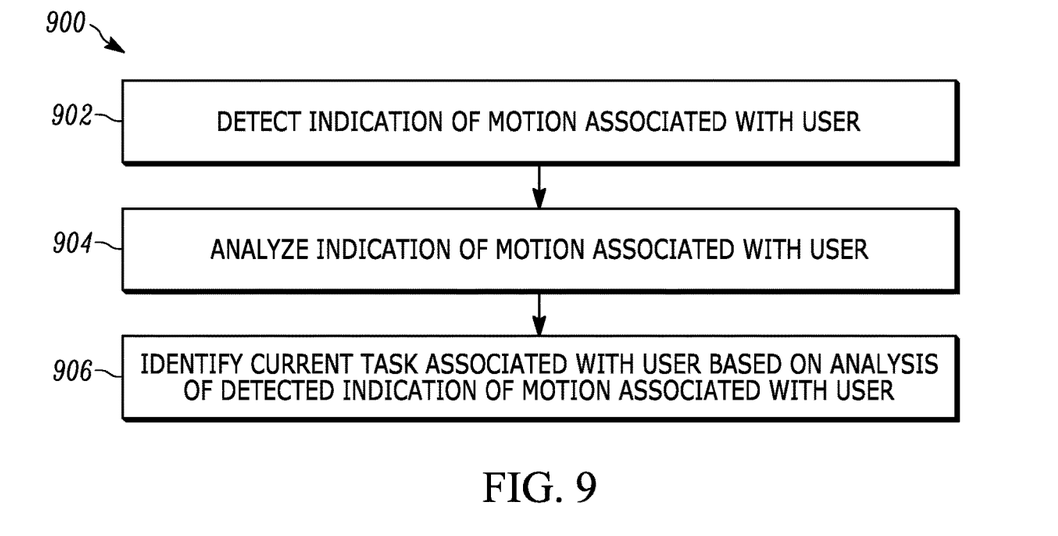
FIG. 9 is a flowchart representative of machine-readable instructions that may be executed to implement an example method of identifying a current task associated with a user of a HUD assembly, in accordance with some embodiments.

FIG. 9 is a flowchart of an example method 900 of identifying a current task associated with the user of the HUD assembly, in accordance with some embodiments, expanding on block 702 of FIG. 7. The method 900 can be implemented as a set of instructions stored on the computer-readable memory 604 and executable on one or more processors 602.

At block 902, an indication of motion associated with the user is detected, e.g., by an accelerometer (or by any other suitable motion sensor) mounted to the HUD assembly. The indication of motion associated with the user may include, for instance, the orientation and/or position of the user, as well as the speed and/or acceleration of the user.

At block 904, the indication of motion associated with the user is analyzed. For example, the data collected by the accelerometer may indicate that the user is crouching down, standing up, walking, taking stairs, standing still, driving in a motorized vehicle (such as a forklift), etc., as well as a direction in which the user is looking (e.g., up, down, left, right.). That is, by analyzing data related to motion of the user and comparing it against known patterns for various human motions, (which may be, for instance, stored in a database accessed by a processor) a specific type of motion of the user is identified.

At block 906, a current task associated with the user is identified based on the analysis of the indication of motion associated with the user. In some instances, the processor accesses a database storing expected types of user motion associated with particular tasks and identifies the current task by matching the identified motion of the user with a particular task. For example, standing still or crouching down motion while the user is looking downward may be associated with a task of reading or scanning a label, while walking or climbing motions while the user is looking upward may be associated with a task of loading a vehicle with boxes, for instance. Accordingly, the user's current task is identified based on the user's movements at the current time.

Figure 10:
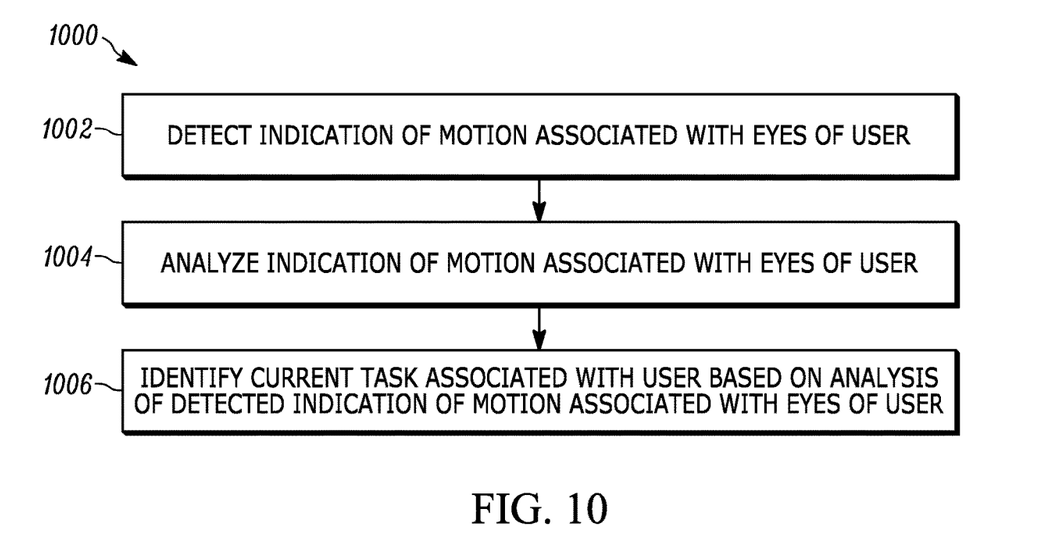
FIG. 10 is a flowchart representative of machine-readable instructions that may be executed to implement an example method of identifying a current task associated with a user of a HUD assembly, in accordance with some embodiments.

FIG. 10 is a flowchart of another example method 1000 of identifying a current task associated with the user of the HUD assembly, in accordance with some embodiments, expanding on block 702 of FIG. 7. The method 1000 can be implemented as a set of instructions stored on the computer-readable memory 604 and executable on one or more processors 602.

At block 1002, an indication of motion associated with the eyes of the user is detected, e.g., by a sensor or camera mounted to the HUD assembly. That is, a sensor or camera faces the eyes of the user and collects data related to the user's eye movements.

At block 1004, the indication of motion associated with the eyes of the user is analyzed. In some instances, the data collected by the sensor or camera is analyzed to determine whether the user's pupils have dilated or constricted. In some instances, the data collected by the sensor or camera is analyzed to determine whether the position of the user's eyes have changed (i.e., whether the user is looking upwards, downwards, to the left or right, or some combination). In some examples, the data collected by the sensor or camera is analyzed to determine the number and/or frequency of blinks of the user's eyes.

At block 1006, a current task associated with the user is identified based on the analysis of the indication of motion associated with the eyes of the user. In some instances, the processor accesses a database storing expected types of eye movements associated with particular tasks and matches the identified motion of the user's eyes to a particular task. In some examples, constricted pupils are related to tasks such as loading boxes into a vehicle, while dilated pupils are related to tasks such as sorting inventory. As another example, looking upwards is related to tasks such as identifying a particular box on a shelf, while looking downwards is related to tasks such as packing boxes. Accordingly, the user's current task is identified based on the user's eye movements at a particular time. In some examples, the database additionally stores expected types of eye movements associated with eye fatigue, and matches the identified motion of the user's eyes to an inferred eye fatigue of the user. For example, infrequent eye motion or infrequent blinking over a certain period of time is associated with user eye fatigue. In some examples, example method 1000 additionally includes generating a notification to the user when eye fatigue is detected. For instance, a user eye fatigue notification may include instructions for the user to take a brief break in order to reduce or avoid eye fatigue.

Moreover, in some instances, the horizontal and/or vertical position of the visual media displayed by the presentation generator is dynamically controlled and/or modified based on the indication of motion associated with the eyes of the user to obtain additional or alternative advantages. In some examples, the position of the center of the user's vision (also called the fovea) is detected by monitoring the motion of the user's pupils, and the horizontal and/or vertical position of the visual media displayed by the presentation generator is dynamically controlled and/or modified based on the position of the fovea. That is, while in some instances the movements of the user's head and the user's eyes are coordinated (e.g., when the user conducts a visual search of an environment around the user), in other instances, the user's eyes move in a different direction than the user's head during visual searches of small angular displacement (e.g., when the user's eyes scan shelf labels that are close to the user) in a reflex eye movement called the vestibulo-ocular reflex. When the user's eyes move in a different direction than the user's head, the horizontal and/or vertical position of the visual media is dynamically controlled to match the position of the user's eyes rather than the user's head so that the visual media consistently appears close to the user's center of vision.

In particular, because human visual acuity degrades significantly at 10 degrees to 15 degrees from the fovea laterally, the visual media is dynamically controlled and/or modified in order to appear within 15 degrees of the user's fovea laterally. For example, when the indication of motion associated with the eyes of the user indicates that the user's pupils are moving horizontally, the position of the visual media may be dynamically modified horizontally based on the horizontal motion of the user's eyes in order to consistently appear within 15 degrees of the user's fovea laterally.

Additionally, the visual media is dynamically controlled and/or modified in order to appear within 20 degrees of the user's line of sight vertically. For example, when the indication of motion associated with the eyes of the user indicates that the user's pupils are currently moving vertically, the position of the visual media may be dynamically modified vertically in order to consistently appear within 20 degrees of the user's line of sight vertically. Accordingly, the visual media consistently appears within 15 degrees of the user's fovea and within 20 degrees below the user's line of sight even as the user's eyes move horizontally and/or vertically, so the user will not need to shift his or her visual focus horizontally and/or vertically in order to view the visual media. Advantageously, eye strain, eye fatigue, and neck strain that occur when users must frequently shift their visual focus horizontally and/or vertically to view visual media off axis may be reduced.

Figure 11:
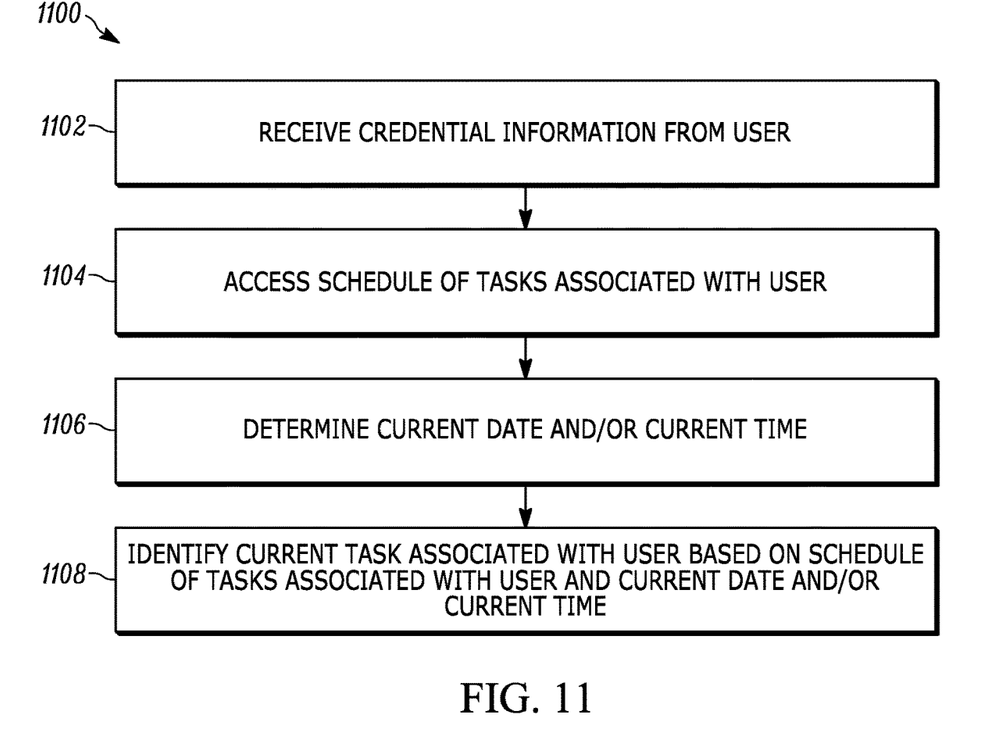
FIG. 11 is a flowchart representative of machine-readable instructions that may be executed to implement an example method of identifying a current task associated with a user of a HUD assembly, in accordance with some embodiments.

FIG. 11 is a flowchart of another example method 1100 of identifying a current task associated with the user of the HUD assembly, in accordance with some embodiments, expanding on block 702 of FIG. 7. The method 1100 can be implemented as a set of instructions stored on the computer-readable memory 604 and executable on one or more processors 602.

At block 1102, credential information associated with the user is received. For example, a user logs in or selects a user profile before or while wearing the HUD assembly. The credential information may be user profile information for that user, for example. In some instances, credential information associated with the user is not required. For example, a user who owns a personal HUD assembly may not be required to log in or provide credentials.

At block 1104, a schedule of tasks associated with the user is accessed. The schedule of tasks may include tasks listed by date and/or by time. For example, one task is to be performed by the user on Monday from 8:00 a.m.-10:00 a.m., while a different task is to be performed by the user on Monday from 10:00 a.m.-10:30 a.m., while still different tasks are to be performed on Tuesday, etc.

At block 1106, a current period of time (e.g., date and/or current time) is determined, and at block 1108, a current task associated with the user is identified based on the schedule of tasks associated with the user and the current period of time. That is, the current period of time is matched with the scheduled task to be performed at the current period of time in order to identify the current task. In this way, the current task being performed by the user is identified based on the date and/or time the task is being performed by the user. In some examples, the time information may be a based on a localized time, such as a timer in a warehouse.

Figure 12:
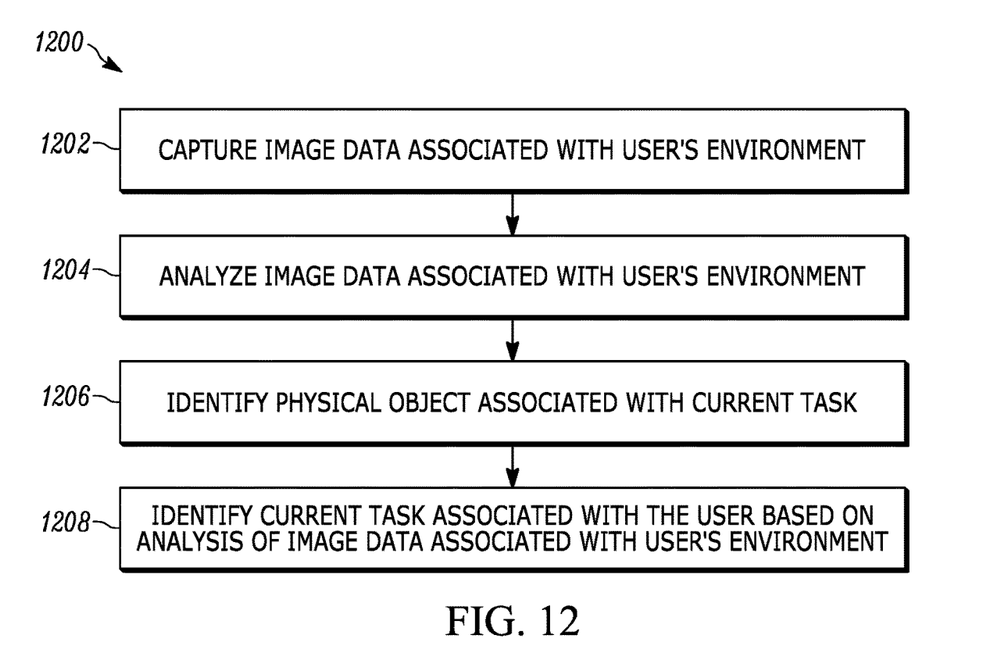
FIG. 12 is a flowchart representative of machine-readable instructions that may be executed to implement an example method of identifying a current task associated with a user of a HUD assembly, in accordance with some embodiments.

FIG. 12 is a flowchart of an additional example method 1200 of identifying a current task associated with the user of the HUD assembly, in accordance with some embodiments, expanding on block 702 of FIG. 7. The method 1200 can be implemented as a set of instructions stored on the computer-readable memory 604 and executable on one or more processors 602.

At block 1202, image data associated with the user's environment is captured, e.g., by a camera or other sensor mounted to the HUD assembly. Generally speaking, the camera or other sensor captures image data associated with the physical space and/or physical objects around the user.

At block 1204, the image data associated with the user's environment is analyzed. In some instances, the analysis includes identifying the user's environment. For example, the image data can be analyzed to determine whether the user is outdoors or indoors, based on, e.g., lighting, colors, or other indications in the image data.

At block 1206, a physical object associated with the current task of the user is identified within the user's environment. That is, the analysis of the image data associated with the user's environment may include an analysis to identify physical objects within the user's environment. For example, box objects, forklifts, inventory objects, or other task-related objects can be identified within the user's environment during the analysis. Moreover, in some instances, labels (e.g., text labels, bar codes, or other labels that can be scanned and analyzed) attached to physical objects within the user's environment are also used to identify physical objects within the user's environment.

At block 1208, a current task associated with the user is identified based on the analysis of the image data associated with the user's environment. In some instances, a processor accesses a database that stores types of environments, types of physical objects, and/or specifically identified physical objects and tasks that are associated with each. Accordingly, based on the analysis of the user's environment and/or based on physical objects that are identified within the user's environment, the current task of the user may be identified. For example, if a label attached to a box object within the user's environment indicates that the box is to be sorted, the user's current task is identified as sorting boxes. As another example, if the analysis of the image data associated with the user's environment indicates that the user is outdoors, the user's current task is identified either as an outdoor task generally, or as a specific outdoor task, such as loading boxes into a vehicle parked outside. In this way, the current task being performed by the user is identified based on image data associated with the user's environment while the task is being performed.

In the foregoing specification, specific embodiments have been described. However, one of ordinary skill in the art appreciates that various modifications and changes can be made without departing from the scope of the present teachings. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

We claim:

1. A system for task-based control of visual media in a heads-up display, the system comprising:
   a heads-up display assembly configured to be worn by a user, the heads-up display assembly comprising
      a head mount, and
      a presentation generator configured to display visual media to the user;
   a memory configured to store computer executable instructions; and
   a processor configured to interface with the presentation generator and the memory, and configured to execute the computer executable instructions to cause the processor to:
      access a schedule of tasks associated with the user;
      determine a period of time;
      identify a current task associated with the user based on the schedule of tasks associated with the user and the current period of time;
      obtain a focal distance at which the visual media is to be displayed during the performance of the current task; and
      cause the presentation generator to display the visual media at the obtained focal distance during performance of the current task.

2. The system of claim 1, wherein the computer executable instructions, when executed, cause the processor to obtain the focal distance by:
   identifying a physical object associated with the current task;
   determining a distance between the user and the physical object; and
   calculating, based on the distance between the user and the physical object associated with the current task, the focal distance at which the visual media is to be displayed during the performance of the current task.

3. The system of claim 1, further comprising an accelerometer carried by the heads-up display assembly, the accelerometer configured to detect an indication of motion associated with the user;
   wherein the processor is configured to interface with the accelerometer, and the computer executable instructions, when executed, cause the processor to identify the current task associated with the user by analyzing the detected indication of motion associated with the user.

4. The system of claim 1, further comprising a sensor carried by the heads-up display assembly, the sensor configured to detect an indication of motion associated with the eyes of the user;
   wherein the processor is configured to interface with the sensor, and the computer executable instructions, when executed, cause the processor to identify the current task associated with the user by analyzing the indication of motion associated with the eyes of the user.

5. The system of claim 4, wherein the indication of motion associated with the eyes of the user is a pupil dilation or a pupil constriction.

6. The system of claim 4, wherein the indication of motion associated with the eyes of the user is one or more of a horizontal motion of pupils or a vertical motion of the pupils.

7. The system of claim 1, wherein the computer executable instructions, when executed, cause the processor to:
   receive credential information from the user; and
   identify the current task associated with the user based on the credential information from the user.

8. The system of claim 1, further comprising: a camera carried by the heads-up display assembly, the camera configured to capture image data associated with an environment including the user;
   wherein the processor is configured to interface with the camera, and the computer executable instructions, when executed, cause the processor to:
   analyze the image data associated with the environment; and
   identify the current task associated with the user based on the analysis of the image data associated with the environment.

9. The system of claim 8, wherein the computer executable instructions, when executed, cause the processor to:
   analyze the image data associated with the environment to identify a physical object associated with the current task; and
   identify the current task associated with the user based on one or more of: (i) apparent dimensions of the identified physical object; (ii) a position of the identified physical object; (iii) a speed of the identified physical object; or (iv) a label attached to the physical object.

10. A computer-implemented method for task-based control of visual media in a heads-up display assembly configured to be worn by a user, the method comprising:
    identifying, by a processor, a current task associated with a user of a heads-up display assembly;
    obtaining, by the processor, a focal distance at which the visual media is to be displayed by a presentation generator of the heads-up display assembly during the performance of the current task; and
    causing, by the processor, the presentation generator to display the visual media during the performance of the current task at the obtained the focal distance,
    wherein identifying the current task associated with the user of the heads-up display assembly comprises:
    accessing a schedule of tasks associated with the user;
    determining a current period of time; and
    identifying the current task associated with the user based on the schedule of tasks associated with the user and the current period of time.

11. The computer-implemented method of claim 10, wherein obtaining the focal distance comprises:
    identifying a physical object associated with the current task;
    determining a distance between the user and the physical object; and
    calculating, based on the distance between the user and the physical object, a desirable focal distance at which the visual media is to be displayed during the performance of the current task.

12. The computer-implemented method of claim 10, wherein identifying the current task associated with the user of the heads-up display assembly comprises:
    detecting, by an accelerometer carried by the heads-up display assembly, an indication of motion associated with the user; and identifying, by the processor, the current task associated with the user by analyzing the detected indication of motion associated with the user.

13. The computer-implemented method of claim 10, wherein identifying the current task associated with the user of the heads-up display assembly comprises:
   detecting, by a sensor carried by the heads-up display assembly, an indication of motion associated with eyes of the user; and
   identifying, by the processor, the current task associated with the user by analyzing the indication of motion associated with the eyes of the user.

14. The computer-implemented method of claim 13, wherein the indication of motion associated with the eyes of the user is a pupil dilation or a pupil constriction.

15. The computer-implemented method of claim 13, wherein the indication of motion associated with the eyes of the user is one or more of a horizontal motion of pupils or a vertical motion of the pupils.

16. The computer-implemented method of claim 10, wherein identifying the current task associated with the user of the heads-up display assembly further comprises:
   receiving credential information from the user; and
   identifying the current task associated with the user based on the credential information from the user.

17. The computer-implemented method of claim 10, wherein identifying the current task associated with the user of the heads-up display assembly further comprises:
   capturing, by a camera carried by the heads-up display assembly, image data associated with an environment including the user;
   analyzing, by the processor, the image data associated with the environment; and
   identifying, by the processor, the current task associated with the user based on the analysis of the image data.

18. The computer-implemented method of claim 17, wherein identifying the current task associated with the user based on the analysis of the image data associated with the user's environment comprises:
   analyzing, by the processor, the image data associated with the user's environment to identify a physical object; and
   identifying, by the processor, the current task associated with the user based on one or more of: (i) apparent dimensions of the identified physical object; (ii) a position of the identified physical object; (iii) a speed of the identified physical object; or (iv) a label attached to the physical object.

* * * * *